United States Patent
Yoneda et al.

(10) Patent No.: US 7,386,383 B2
(45) Date of Patent: Jun. 10, 2008

(54) DIFFERENTIAL LIMITING CONTROL APPARATUS FOR A VEHICLE AND THE METHOD THEREOF

(75) Inventors: Takeshi Yoneda, Tokyo (JP); Shinichiro Kojima, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 896 days.

(21) Appl. No.: 10/667,393

(22) Filed: Sep. 23, 2003

(65) Prior Publication Data

US 2004/0059491 A1  Mar. 25, 2004

(30) Foreign Application Priority Data

Sep. 24, 2002  (JP)  ............ P. 2002-278130

(51) Int. Cl.
*G06F 7/00* (2006.01)
(52) U.S. Cl. ............... 701/69; 701/67; 477/80; 477/86; 180/242; 180/247; 180/248
(58) Field of Classification Search ............. 701/69, 701/67; 477/80, 81, 86; 180/242, 243, 247, 180/248, 249; 192/32
See application file for complete search history.

(56) References Cited

U.S. PATENT DOCUMENTS

| | | | |
|---|---|---|---|
| 5,090,510 A | * | 2/1992 | Watanabe et al. ......... 180/197 |
| 5,216,342 A | * | 6/1993 | Torii et al. ............... 318/568.1 |
| 5,322,150 A | | 6/1994 | Schmidt-Brucken et al. |
| 5,323,870 A | | 6/1994 | Parigger et al. |
| 5,439,428 A | * | 8/1995 | Slicker .................... 477/175 |
| 5,947,224 A | | 9/1999 | Kouno |
| 2001/0025219 A1 | | 9/2001 | Ohba et al. |
| 2004/0059494 A1 | | 3/2004 | Yoneda |

FOREIGN PATENT DOCUMENTS

| | | |
|---|---|---|
| EP | 0 668 453 | 8/1995 |
| JP | 6-211063 | 8/1994 |
| JP | 9-109716 | 4/1997 |

OTHER PUBLICATIONS

U.S. Appl. No. 10/667,396, Sep. 23, 2003.

* cited by examiner

*Primary Examiner*—Khoi H. Tran
*Assistant Examiner*—Marie A Weiskopf
(74) *Attorney, Agent, or Firm*—Smith, Gambrell & Russell, LLP (57) ABSTRACT

A differential limiting control apparatus for a vehicle has: clutch unit interposed between one rotational shaft and the other rotational shaft for variably transmitting a driving force between the one rotational shaft and the other rotational shaft; target differential speed setting unit for setting a target differential speed between the one rotational shaft and the other rotational shaft, actual differential speed detecting unit for detecting an actual differential speed between the one rotational shaft and the other rotational shaft, and clutch torque computing unit for computing an engagement force of the clutch unit by obtaining a deviation between the target differential speed and the actual differential speed, configuring a switching function by using at least a polarity related to an integral term of the deviation, and applying a sliding mode control.

44 Claims, 4 Drawing Sheets

DIFFERENTIAL LIMITING CONTROL APPARATUS FOR A VEHICLE AND THE METHOD THEREOF

BACKGROUND OF THE INVENTION

1. Field of the Invention

The present invention relates to a differential limiting control apparatus for a vehicle installed between a front axle and a rear axle of a four wheel drive vehicle, particularly to a differential limiting a differential motion between rotational shafts of front and rear wheel.

2. Description of the Related Art

Conventionally, as a differential limiting control between one rotational shaft and the other rotational shaft, in particular, between front and rear axles of a four wheel drive vehicle, a technique has been known in which an actual differential speed between the rotational shafts is detected is caused to converge to a target differential speed by a feedback control through a PID (proportional Integration and Differentiation) control.

Under various kinetic conditions of the vehicle, however, there may be caused a risk that a simple PID control causes response and hunting problems, and to cope with this, a countermeasure is adopted in which respective gains in the PID control are interlocked with other parameters (such as lateral acceleration, acceleration, yaw rate). For example, JP-A-6-211063 discloses a technique in which a proportional term gain, a differential term gain and an integral term gain are variably set in accordance with a speed differential between one rotating shaft and another rotating shaft when a yawing momentum is feedback controlled through a PD control or PID control by distributing the driving force between left and right wheels or front and rear wheels.

In the technique in which the aforesaid gains are interlocked with the other parameters to be set, however, to deal with the respective parameters which change every moment while the vehicle is running, highly accurate sensors and high-speed computation processing functions are required. However, when attempting to realize a highly accurate and good-response traction performance, there are caused problems that the costs of a whole system are increased and that the system becomes complicated.

SUMMARY OF THE INVENTION

The present invention was made in view of the situations, and an object thereof is to provide a differential limiting control apparatus for a vehicle which can realize a highly accurate and good-response traction performance without increasing the costs of a whole system and making the system complicated.

With a view to attaining the object, in accordance with a first aspect of the present invention, a differential limiting control apparatus for a vehicle having: a clutch unit interposed between one rotational shaft and the other rotational shaft for variably transmitting a driving force between the one rotational shaft and the other rotational shaft, a target differential speed setting unit for setting a target differential speed between the one rotational shaft and the other rotational shaft, an actual differential speed detecting unit for detecting an actual differential speed between the one rotational shaft and the other rotational shaft, and a clutch torque computing unit for computing an engagement force of the clutch unit by obtaining a deviation between the target differential speed and the actual differential speed, configuring a switching function by using at least a polarity related to an integral term of the deviation, and applying a sliding mode control.

In addition, according to a second aspect of the present invention, there is provided a differential limiting control apparatus for a vehicle as set forth in the first aspect of the present invention, wherein the switching function configured at the clutch torque computing unit is such as to result from adding a value obtained by multiplying a differential term of the deviation between the target differential speed and the actual differential speed by a predetermined gain to a value obtained by multiplying a value of the polarity by a predetermined gain.

Furthermore, according to a third aspect of the present invention, there is provided a differential limiting control apparatus for a vehicle as set forth in the first or second aspect of the present invention, wherein the clutch torque computing unit computes a final engagement force of the clutch unit by adding a value obtained by multiplying a proportional term of the deviation between the target differential speed and the actual differential speed by a predetermined gain to an engagement force of the clutch unit computed through the sliding mode control.

In addition, according to a fourth aspect of the present invention, there is provided a differential limiting control apparatus for a vehicle having a clutch unit interposed between one rotational shaft and the other rotational shaft for variably transmitting a driving force between the one rotational shaft and the other rotational shaft, a target differential speed setting unit for setting a target differential speed between the one rotational shaft and the other rotational shaft, an actual differential speed detecting unit for detecting an actual differential speed between the one rotational shaft and the other rotational shaft, and a clutch torque computing unit for computing an engagement force of the clutch unit by configuring a switching function having a term where a value of a polarity computed using an integral term based on at least a deviation between the target differential speed and the actual differential speed is multiplied by a predetermined gain and using a sliding mode control where when the switching function takes a positive value, the value of the switching function is used as a control value.

Furthermore, according to a fifth aspect of the present invention, there is provided a differential limiting control apparatus for a vehicle as set forth in the fourth aspect of the present invention, wherein the switching function configured at the clutch torque computing unit is such as to result from adding a value obtained by multiplying a differential term of the deviation between the target differential speed and the actual differential speed by a predetermined gain to a value obtained by multiplying a value of the polarity by a predetermined gain.

Additionally, according to a sixth aspect of the present invention, there is provided a differential limiting control apparatus for a vehicle as set forth in the fourth or fifth aspect of the present invention, wherein the clutch torque computing unit computes a final engagement force of the clutch unit by adding an engagement force of the clutch unit computed through a proportional control based on the target differential speed and the actual differential speed to an engagement force of the clutch unit computed through the sliding mode control.

Furthermore, according to a seventh aspect of the present invention, there is provided a differential limiting control apparatus for a vehicle as set forth in any one of the first, second, fourth and fifth aspects of the present invention, wherein the clutch unit is interposed between a front and a rear axles, wherein the target differential speed setting unit sets a target differential speed at least either one of between the front and rear axles, a left front wheel and a right front wheel, or a left rear wheel and a right rear wheel, wherein the actual differential speed detecting unit detects an actual differential speed at least either one of between the front and rear axles, the left front wheel and the right front wheel, or the left rear wheel and the right rear wheel which corresponds to the target differential speed setting unit, and wherein the clutch torque computing unit computes an engagement force of the clutch unit using a deviation between a target differential speed set at the target differential speed setting unit and an actual differential speed detected at the actual differential speed detecting unit.

In addition, according to an eighth aspect of the present invention, there is provided a differential limiting control apparatus for a vehicle as set forth in any one of the first, second, fourth and fifth aspects of the present invention, wherein the clutch unit is a clutch unit for limiting a differential motion of a differential interposed between left and right wheels, wherein the target differential speed setting unit sets a target differential speed between the left and right wheels, wherein the actual differential speed detecting unit detects an actual differential speed between the left and right wheels, and wherein the clutch torque computing unit computes an engagement force of the clutch unit using a deviation between a target differential speed set at the target differential speed setting unit and an actual differential speed detected at the actual differential speed detecting unit.

Furthermore, according to a ninth aspect of the present invention, there is provided a differential limiting control apparatus for a vehicle as set forth in any one of the first, second, fourth and fifth aspects of the present invention, wherein the clutch unit is interposed between a front and a rear axles, wherein the target differential speed setting unit sets target differential speeds at least a plurality of between the front and rear axles, a left front wheel and a right front wheel, and a left rear wheel and a right rear wheel, wherein the actual differential speed detecting unit detects actual differential speeds at least a plurality of between the front and rear axles, the left front wheel and the right front wheel, and the left rear wheel and the right rear wheel which correspond to the target differential speed setting unit, and wherein the clutch torque computing unit computes a plurality of engagement forces of the clutch unit using target differential speeds set at the target differential speed setting unit and actual differential speeds detected at the actual differential speed detecting unit, and computes one of the plurality of engagement forces of the clutch unit which has a maximum value as a final engagement force of the clutch unit.

In addition, according to a tenth aspect of the present invention, there is provided a differential limiting control apparatus for a vehicle as set forth in any one of the first, second, fourth and fifth aspects of the present invention, wherein the target differential speed setting unit sets in advance a lower limit value of the actual differential speed according to at least one of a vehicle speed, a lateral acceleration and an input torque inputted into the clutch unit and sets the target differential speed based on the lower limit value so set.

Furthermore, according to an eleventh aspect of the present invention, there is provided a differential limiting control apparatus for a vehicle as set forth in any one of the first, second, fourth and fifth aspects of the present invention, wherein the target differential speed setting unit can selectively alter the target differential value that is set thereby.

In addition, according to a twelfth aspect of the present invention, there is provided a differential limiting control apparatus for a vehicle as set forth in any one of the first, second, fourth and fifth aspects of the present invention, wherein the clutch torque computing unit leaves an engagement force of the clutch unit a preset value at least either one of when brakes are applied or when an antilock braking system is in operation.

With a view to attaining the object, according to a thirteenth aspect of the present invention, a differential limiting control method for a vehicle having a clutch unit interposed between one rotational shaft and the other rotational shaft for variably transmitting a driving force between the one rotational shaft and the other rotational shaft, having steps of setting a target differential speed between the one rotational shaft and the other rotational shaft, detecting an actual differential speed between the one rotational shaft and the other rotational shaft, and computing an engagement force of the clutch unit by obtaining a deviation between the target differential speed and the actual differential speed, configuring a switching function by using at least a polarity related to an integral term of the deviation, and applying a sliding mode control.

In addition, according to a fourteenth aspect of the present invention, there is provided a differential limiting control method for a vehicle as set forth in the thirteenth aspect of the present invention, wherein the switching function configured at the clutch torque computing step is such as to result from adding a value obtained by multiplying a differential term of the deviation between the target differential speed and the actual differential speed by a predetermined gain to a value obtained by multiplying a value of the polarity by a predetermined gain.

Furthermore, according to a fifteenth aspect of the present invention, there is provided a differential limiting control method for a vehicle as set forth in the thirteenth or fourteenth aspect of the present invention, wherein the clutch torque computing step computes a final engagement force of the clutch unit by adding a value obtained by multiplying a proportional term of the deviation between the target differential speed and the actual differential speed by a predetermined gain to an engagement force of the clutch unit computed through the sliding mode control.

In addition, according to a sixteenth aspect of the present invention, there is provided a differential limiting control method for a vehicle having a clutch unit interposed between one rotational shaft and the other rotational shaft for variably transmitting a driving force between the one rotational shaft and the other rotational shaft, a target differential speed setting step for setting a target differential speed between the one rotational shaft and the other rotational shaft, an actual differential speed detecting step for detecting an actual differential speed between the one rotational shaft and the other rotational shaft, and a clutch torque computing step for computing an engagement force of the clutch unit by configuring a switching function having a term where a value of a polarity computed using an integral term based on at least a deviation between the target differential speed and the actual differential speed is multiplied by a predetermined gain and using a sliding mode control where when the switching function takes a positive value, the value of the switching function is used as a control value.

Furthermore, according to a seventeenth aspect of the present invention, there is provided a differential limiting control method for a vehicle as set forth in the sixteenth aspect of the present invention, wherein the switching function configured at the clutch torque computing unit is such as to result from adding a value obtained by multiplying a differential term of the deviation between the target differential speed and the actual differential speed by a predetermined gain to a value obtained by multiplying a value of the polarity by a predetermined gain.

Additionally, according to a eighteenth aspect of the present invention, there is provided a differential limiting control method for a vehicle as set forth in the sixteenth or seventeenth aspect of the present invention, wherein the clutch torque computing step computes a final engagement force of the clutch unit by adding an engagement force of the clutch unit computed through a proportional control based on the target differential speed and the actual differential speed to an engagement force of the clutch unit computed through the sliding mode control.

Furthermore, according to a nineteenth aspect of the present invention, there is provided a differential limiting control method for a vehicle as set forth in any one of the thirteenth, fourteenth, sixteenth and seventeenth aspects of the present invention, wherein the clutch unit is interposed between a front and a rear axles, wherein the target differential speed setting step sets a target differential speed at least either one of between the front and rear axles, a left front wheel and a right front wheel, or a left rear wheel and a right rear wheel, wherein the actual differential speed detecting step detects an actual differential speed at least either one of between the front and rear axles, the left front wheel and the right front wheel, or the left rear wheel and the right rear wheel which corresponds to the target differential speed setting step, and wherein the clutch torque computing unit computes an engagement force of the clutch unit using a deviation between a target differential speed set at the target differential speed setting unit and an actual differential speed detected at the actual differential speed detecting step.

In addition, according to a twentieth aspect of the present invention, there is provided a differential limiting control method for a vehicle as set forth in any one of the thirteenth, fourteenth, sixteenth and seventeenth aspects of the present invention, wherein the clutch unit is a clutch unit for limiting a differential motion of a differential interposed between left and right wheels, wherein the target differential speed setting step sets a target differential speed between the left and right wheels, wherein the actual differential speed detecting step detects an actual differential speed between the left and right wheels, and wherein the clutch torque computing step computes an engagement force of the clutch unit using a deviation between a target differential speed set at the target differential speed setting step and an actual differential speed detected at the actual differential speed detecting step.

Furthermore, according to a twenty-first aspect of the present invention, there is provided a differential limiting control method for a vehicle as set forth in any one of the thirteenth, fourteenth, sixteenth and seventeenth aspects of the present invention, wherein the clutch unit is interposed between a front and a rear axles, wherein the target differential speed setting step sets target differential speeds at least a plurality of between the front and rear axles, a left front wheel and a right front wheel, and a left rear wheel and a right rear wheel, wherein the actual differential speed detecting step detects actual differential speeds at least a plurality of between the front and rear axles, the left front wheel and the right front wheel, and the left rear wheel and the right rear wheel which correspond to the target differential speed setting step, and wherein the clutch torque computing step computes a plurality of engagement forces of the clutch unit using target differential speeds set at the target differential speed setting step and actual differential speeds detected at the actual differential speed detecting step, and computes one of the plurality of engagement forces of the clutch unit which has a maximum value as a final engagement force of the clutch unit.

In addition, according to a twenty-second aspect of the present invention, there is provided a differential limiting control method for a vehicle as set forth in any one of the thirteenth, fourteenth, sixteenth and seventeenth aspects of the present invention, wherein the target differential speed setting step sets in advance a lower limit value of the actual differential speed according to at least one of a vehicle speed, a lateral acceleration and an input torque inputted into the clutch unit and sets the target differential speed based on the lower limit value so set.

Furthermore, according to an twenty-third aspect of the present invention, there is provided a differential limiting control method for a vehicle as set forth in any one of the thirteenth, fourteenth, sixteenth and seventeenth aspects of the present invention, wherein the target differential speed setting step can selectively alter the target differential value that is set thereby.

In addition, according to a twenty-fourth aspect of the present invention, there is provided a differential limiting control method for a vehicle as set forth in any one of the thirteenth, fourteenth, sixteenth and seventeenth aspects of the present invention, wherein the clutch torque computing step leaves an engagement force of the clutch unit a preset value at least either one of when brakes are applied or when an antilock braking system is in operation.

Namely, in the differential limiting control apparatus for the vehicle according to the first aspect of the present invention, the target differential speed setting unit sets a target differential speed between the one rotational shaft and the other rotational shaft, and the actual differential speed detecting unit detects an actual differential speed between the one rotational shaft and the other rotational shaft. Then, the clutch torque computing unit obtains a deviation between the target differential speed and the actual differential speed, configures a switching function using the polarity of the integral term of at least the deviation so obtained, and computes an engagement force of the clutch unit by applying the sliding mode control and controls the clutch unit with the engagement force so computed. Thus, since a quick response can be provided relative to a slight deviation from the target differential speed by designing such that the engagement force of the clutch unit is computed by making use of the sliding mode control, a highly accurate and good-response traction performance can be realized without increasing the costs of a whole system using highly accurate sensors and making the system complicated.

As this occurs, the switching function configured at the clutch torque computing unit is, as described in the second aspect of the present invention, such as to result from adding a value obtained by multiplying the differential term of the deviation between the target differential speed and the actual differential speed by the predetermined gain to a value obtained by multiplying a value of the polarity by a predetermined gain.

In addition, as described in the third aspect of the present invention, the clutch torque computing unit computes a final engagement force of the clutch unit by adding a value obtained by multiplying a proportional term of the deviation between the target differential speed and the actual differential speed by a predetermined gain to an engagement force of the clutch unit computed through the sliding mode control.

Furthermore, in the differential limiting control apparatus for the vehicle according to the fourth aspect of the present invention, the target differential speed setting unit sets a target differential speed between the one rotational shaft and the other rotational shaft, and the actual differential speed detecting unit detects an actual differential speed between the one rotational shaft and the other rotational shaft. Then, the clutch torque computing unit computes an engagement force of the clutch unit by configuring a switching function having a term where a value of a polarity computed using an integral term based on at least a deviation between the target differential speed and the actual differential speed is multiplied by a predetermined gain and using a sliding mode control where when the switching function takes a positive value, the value of the switching function is used as a control value, and controls the clutch unit with the engagement force so computed. Namely, in the conventional automotive differential limiting control apparatus in which a clutch torque is calculated through the PID control, since the integral term possesses the past hysteresis of control deviation, it took time to converge the clutch torque on an appropriate value, and there was caused a risk that the response of the control is deteriorated. In the differential limiting control apparatus for the vehicle according to the fourth aspect of the present invention, since only the gain is changed in an ON-OFF fashion using the polarity of the integral term and the clutch torque is computed using the sliding mode control in which the actual value is caused to approximate the target value, there is no possibility that the past hysteresis is reflected as having happened with the conventional integral term, whereby the response of the control can be improved drastically, and this can be attained with an inexpensive system. Consequently, a highly accurate and good-response traction performance can be realized without increasing the costs of a whole system using highly accurate sensors and making the system complicated.

By adding the configuration described in the fifth aspect to the fourth aspect of the present invention, the following function and advantage can be obtained in addition to those provided by the fourth aspect of the present invention. Namely, as is described in the fourth aspect, in case the computing equation of the sliding mode control possesses only the term where the polarity of the integral term is multiplied by the gain, the control is only allowed to work in the ON-OFF fashion when the value exceeds 0. However, in the differential limiting control apparatus for the vehicle according to the fifth aspect of the present invention, since the switching function is such as to result from adding the term where the differential term is multiplied by the predetermined gain to the term where the value of the polarity is multiplied by the predetermined gain, a term so resulting from the addition functions as a blind sector. In other words, since the control does not work until the value obtained by multiplying the polarity by the predetermined gain exceeds the value obtained by multiplying the differential term by the predetermined gain, chattering can effectively be prevented.

Additionally, by adding the configuration described in the sixth aspect to the fourth or fifth aspect of the present invention, the following function and advantage can be obtained in addition to those provided by the fourth or fifth aspect of the present invention. Namely, only with the proportional control, while the follow-up capability is not bad relative to a moderate control where a deviation between the target differential speed and the actual differential speed is small, it is not possible to follow up a deviation which does not fall within a range that can be allowed for by tire slippage. Consequently, according to the sixth aspect of the present invention, the follow-up capability can also be improved relative to a large deviation by adding the sliding mode control to the proportional control.

In addition, as is specifically described in the seventh aspect of the present invention, the clutch unit is interposed between a front and a rear axles, the target differential speed setting unit sets a target differential speed at least either one of between the front and rear axles, a left front wheel and a right front wheel, or a left rear wheel and a right rear wheel, the actual differential speed detecting unit detects an actual differential speed at least either one of between the front and rear axles, the left front wheel and the right front wheel, or the left rear wheel and the right rear wheel which corresponds to the target differential speed setting unit, and the clutch torque computing unit computes an engagement force of the clutch unit using a deviation between a target differential speed set at the target differential speed setting unit and an actual differential speed detected at the actual differential speed detecting unit.

Furthermore, as is specifically described in the eighth aspect of the present invention, the clutch unit is a clutch unit for limiting a differential motion of a differential interposed between left and right wheels, the target differential speed setting unit sets a target differential speed between the left and right wheels, the actual differential speed detecting unit detects an actual differential speed between the left and right wheels, and the clutch torque computing unit computes an engagement force of the clutch unit using a deviation between a target differential speed set at the target differential speed setting unit and an actual differential speed detected at the actual differential speed detecting unit.

Additionally, as is specifically described in the ninth aspect of the present invention, the clutch unit is interposed between a front and a rear axles, the target differential speed setting unit sets target differential speeds at least a plurality of between the front and rear axles, a left front wheel and a right front wheel, and a left rear wheel and a right rear wheel, the actual differential speed detecting unit detects actual differential speeds at least a plurality of between the front and rear axles, the left front wheel and the right front wheel, and the left rear wheel and the right rear wheel which correspond to the target differential speed setting unit, and the clutch torque computing unit computes a plurality of engagement forces of the clutch unit using target differential speeds set at the target differential speed setting unit and actual differential speeds detected at the actual differential speed detecting unit, and computes one of the plurality of engagement forces of the clutch unit which has a maximum value as a final engagement force of the clutch unit. As a result, of the clutch torques, the clutch torque is set which prevents a slippage of wheels between which there exists a largest slippage, whereby the stability of the vehicle can be improved.

In addition, as is described in the tenth aspect of the present invention, in the event that the target differential speed setting unit is designed to set in advance a lower limit value of the actual differential speed according to at least one of a vehicle speed, a lateral acceleration and an input torque inputted into the clutch unit and to set the target differential speed based on the lower limit value so set, it is possible to obtain a target differential speed which accurately reflects the kinetic conditions of the vehicle, an accurate control being thereby implemented.

Furthermore, as is described in the eleventh aspect of the present invention, in the event that the target differential speed setting unit can selectively alter the target differential value that is set thereby, it is possible to obtain a natural control characteristic according to the preference of the driver.

In addition, as is described in the twelfth aspect of the present invention, the clutch torque computing unit leaves an engagement force of the clutch unit a preset value at least either one of when brakes are applied or when an antilock braking system is in operation, whereby an unnecessary interference can be provided that would otherwise occur when brakes are applied and when the antilock brake system is in operation.

DETAILED DESCRIPTION OF THE PREFERRED EMBODIMENTS

An embodiment of the present invention will be described below by referent to the accompanying drawings.

Figure 1:
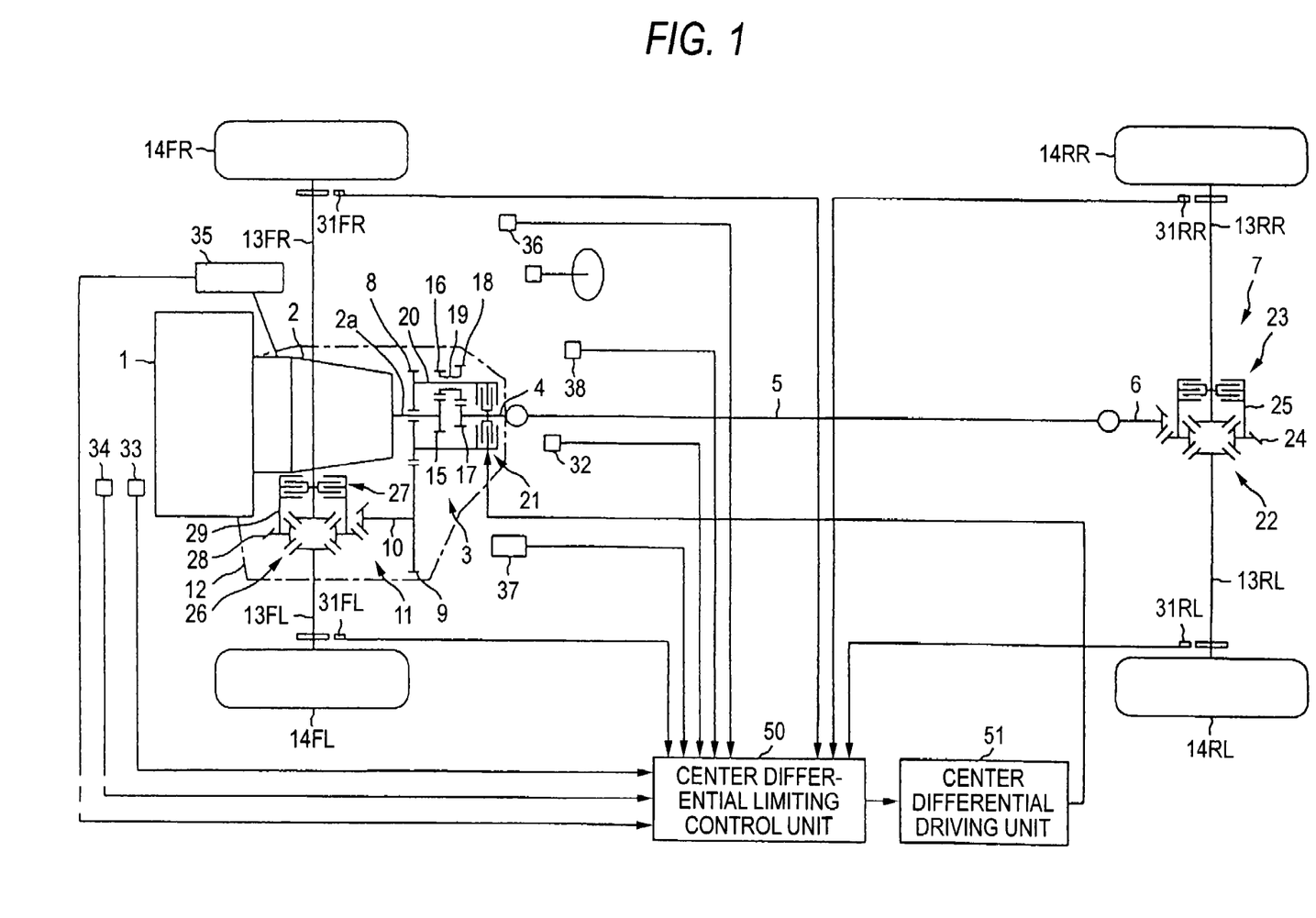
FIG. 1 is a schematic explanatory diagram of a vehicle drive line and a center differential limiting control unit.
Figure 2:
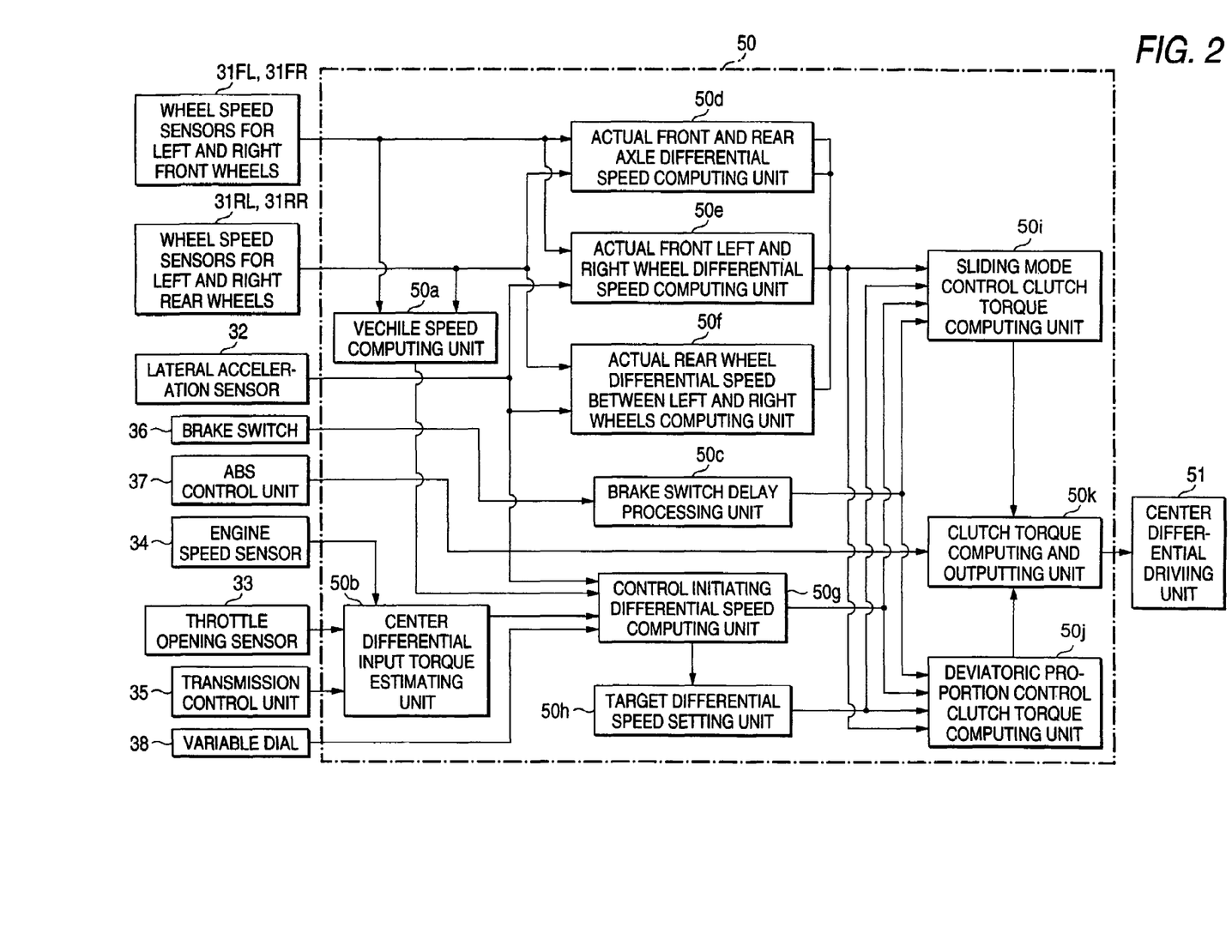
FIG. 2 is a functional block diagram of the center differential limiting control unit.
Figure 3:
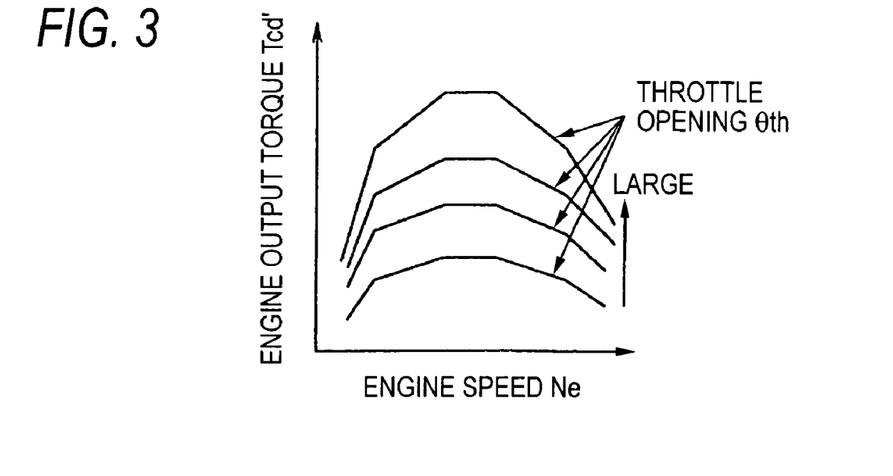
FIG. 3 is an explanatory diagram showing an example of a map of engine output characteristics.
Figure 4:
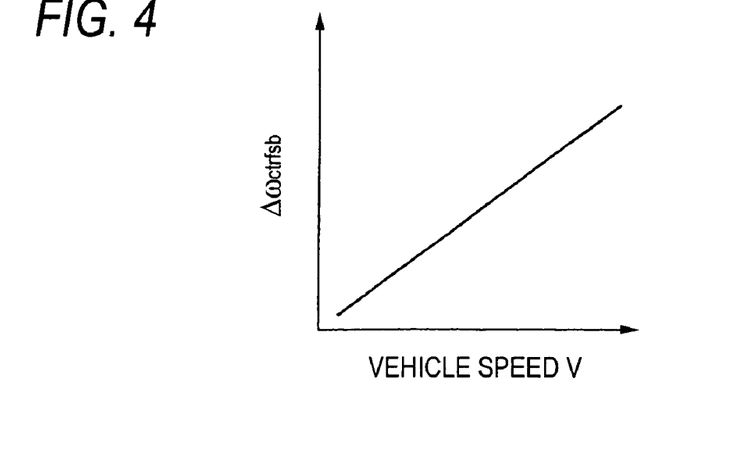
FIG. 4 is an explanatory diagram showing an example of a basic value map of a vehicle speed and a front and rear axle control initiating differential speed.
Figure 5:
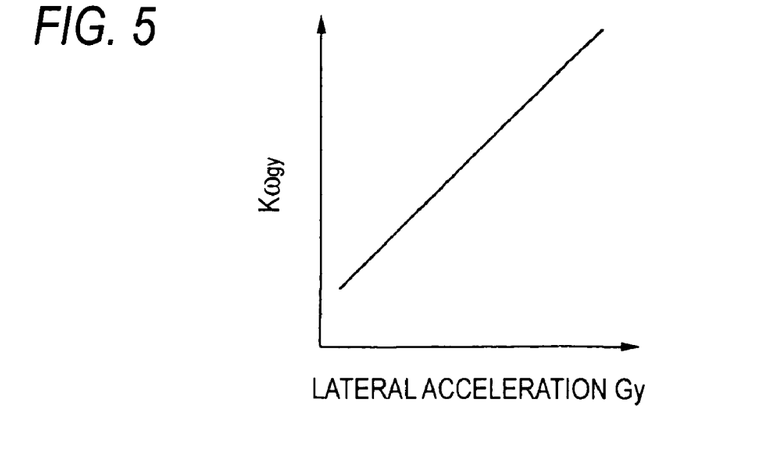
FIG. 5 is an explanatory diagram showing an example of a correction coefficient map of the front and rear axle control initiating differential speed based on a lateral acceleration.
Figure 6:
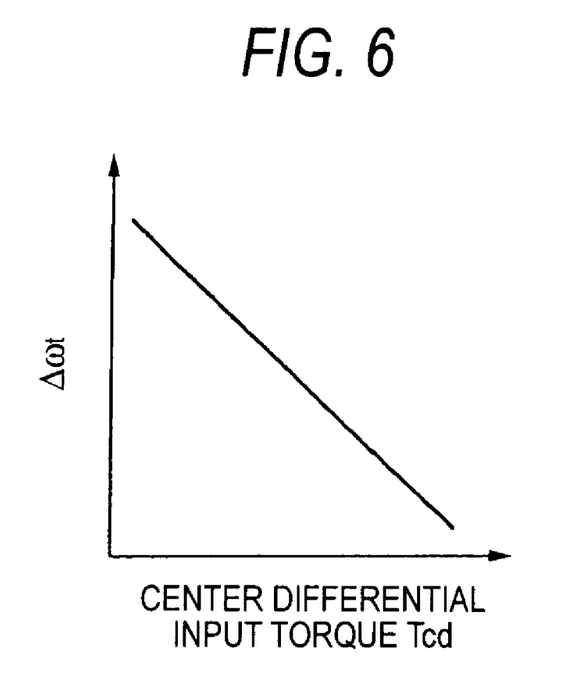
FIG. 6 is an explanatory diagram showing an example of a correction coefficient map of the front and rear axle control initiating differential speed based on a center differential input torque; and, FIG. 7 is an explanatory diagram showing an example of a correction coefficient map of the front and rear axle control initiating differential speed based on a dial position.
Figure 7:
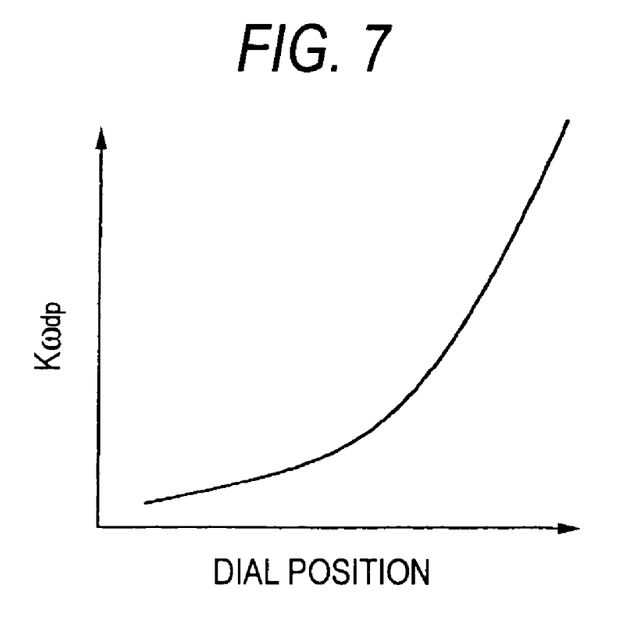

FIGS. 1 to 7 show an embodiment of the present invention, in which FIG. 1 is a schematic explanatory diagram of a driving force transmitting line of a vehicle and a center differential limiting control unit, FIG. 2 is a functional block diagram of the limiting control unit, FIG. 3 is an explanatory diagram showing an example of a map of engine output characteristics, FIG. 4 is the explanatory diagram showing an example of a basic value map of a vehicle speed and a front and rear axle control initiating differential speed, FIG. 5 is the explanatory diagram showing an example of a correction factor map of the front and rear axle control initiating differential speed based on a lateral acceleration, FIG. 6 is an explanatory diagram showing an example of a correction factor map of the front and rear axle control initiating differential speed based on a center differential input torque, and FIG. 7 is an explanatory diagram showing an example of a correction factor map of the front and rear axle control initiating differential speed based on a dial position In FIG. 1, reference numeral 1 denotes an engine placed at a front part of a vehicle, and a driving force generated by the engine 1 is transmitted to a center differential 3 from an automatic transmission (shown as including a torque converter) behind the engine 1 by a transmission output shaft 2a. the driving force, which exits the center differential 3 toward a rear wheel side, is then inputted into a rear final-drive differential 7 via a rear drive shaft 4, a propeller shaft 5 and a driving pinion 6, whereas the driving force which is directed toward a front wheel side is inputted into a front final-drive differential 11 via a transfer drive gear 8, a transfer driven gear 9, and a front drive shaft 10 which constitutes a drive pinion shaft portion. Here, the automatic transmission 2, the center differential 3 and the front final-drive differential 11 are provided integrally within a case 12.

The driving force inputted into the rear final-drive differential 7 is transmitted to a left rear wheel 14RL by a left drive shaft 13RL, while being transmitted to a right wheel 14RR by a right drive shaft 13RR. In addition, the driving force inputted into the front final-drive differential is transmitted to a left front wheel 14FL by a front left drive shaft 13FL, while being transmitted to a right front wheel 14FR by a front right drive shaft 13FR.

A first sun gear 15 with a large diameter is formed on the input side transmission output shaft 2a of the center differential 3, and the first sun gear 15 meshes with a first pinion 16 with a small diameter, whereby a first gear train is constituted.

In addition, a second sun gear 17 with the small diameter is formed on the rear drive shaft 4 which outputs the driving force toward the rear wheels, and the second sun gear 17 meshes with a second pinion 18 with the large diameter, whereby a second gear train is constituted.

The first pinion 16 and the second pinion 18 are formed integrally on pinion members 19, respectively, and a plurality (for example, three) of the pinion members 19 are rotatably supported on a fixed shaft provided on a carrier 20. Then, the transfer drive gear 8 is coupled to a front end of the carrier 20 for transmitting to the front wheels.

Furthermore, the transmission output shaft 2a is rotatably inserted into the carrier 20 from the front, whereas the rear drive shaft 4 is rotatably inserted into the carrier 20 from the rear, and the first sung gear 15 and the second sun gear 17 are installed in a space central within the carrier 20. Then, the respective first pinions 16 and second pinions 18 on the plurality of pinion members 19 are both caused to mesh with the first sun gear 15 and the second sun gear 17, respectively.

Thus, the first and second pinions 16, 18 and the second sun gear 17 which constitute one output side and the carrier 20 of the first and second pinions 16, 18 which constitutes the other output side are meshed with the first sun gear 15 which constitutes an input side.

The composite planetary-type center differential 3 provides a differential function by setting the numbers of teeth of the first and second sun gears 15, 17 and the plurality of first and second pinions 16, 18 that are disposed around circumferences of the sun gears 15, 17.

In addition, a basic torque distribution is made to be a desired distribution (for example, an uneven torque distribution in which the driving torque is distributed heavily on the rear wheels) by setting appropriately meshing pitch radii of the first and second pinions 16, 18 with the first and second sun gears 15, 17, respectively.

The center differential 3 allows a thrust load to remain without being cancelled by using, for example, helical gears for the first and second sun gears 15, 17 and the first and second pinion gears 16, 18, and allowing a helix angle between those of the first gear train and the second gear train to differ from each other. Furthermore, friction torques generated at ends of the pinion member 19 are set such that the friction torques are separated to the surface of the first and second pinions 16, 18 and the fixed shaft provided on the carrier 20 through meshing and are generated when a resultant force of a tangential loads is applied. Thus, by allowing a differential motion limiting torque proportional to an input torque to be obtained, the center differential 3 itself is also allowed to provide a differential motion limiting function.

Moreover, a center differential clutch (a transfer clutch) 21 which adopts a hydraulic multiple disc clutch provided between the two output members or the carrier 20 and the rear drive shaft 4 of the center differential 3 for varying the distribution of the driving force between the front and rear wheels 14FL, FR, RL, RR. Then, a torque distribution between the front and rear wheels 14FL, FR, RL, RR is allowed to be controlled to vary within a range from a four wheel drive in which the front and rear axles are directly coupled from a torque distribution ratio of 50/50 to the torque distribution ratio (of, for example, 35/65 front and rear) by controlling the engagement force of the transfer clutch 21.

The transfer clutch 21 is connected to a center differential clutch driving unit 51 including a hydraulic circuit incorporating therein a plurality of solenoid valves, whereby the transfer clutch 51 is disengaged and engaged by a hydraulic pressure generated by the center differential clutch driving unit 51. Then, control signals (output signals directed to the respective solenoid valves) for driving the center differential clutch driving unit 51 are outputted from a center differential limiting control unit 50 as described below.

On the other hand, the rear final-drive differential 7 includes a bevel gear type differential mechanism unit 22 and a rear differential clutch 23 which adopts a hydraulic multiple disc clutch for limiting a differential motion between the left and right wheels. The rear differential clutch 23 is provided between a differential case 25 to which a ring gear 24 with which a drive pinion 6 is allowed to mesh is fixed and a rear wheel right drive shaft 13RR.

In addition, similarly, the front final-drive differential 11 includes a bevel gear type differential mechanism unit 26 and a front differential clutch 27 which adopts the hydraulic multiple disc clutch for limiting the differential motion between the left and right wheels. The front differential clutch 27 is provided between a differential case 29 to which a ring gear 28 with which the drive pinion of the front drive shaft 10 is allowed to mesh is fixed and a front wheel right drive shaft 13FR.

Signals required for the control are inputted into the center differential limiting control unit 50 from respective sensors as will be described later on.

Namely, wheel speeds of the respective wheels 14FL, 14FR, 14RL, 14RR are detected by wheel speed sensors 31FL, 31FR, 31RL, 31RR, respectively, and are then inputted into the center differential limiting control unit 50. In addition, a lateral acceleration Gy which is being generated in the vehicle, an opening θth of a throttle valve of the engine, an engine speed Ne and a gear ratio Gr of the automatic transmission 2 are inputted into the center differential limiting control unit 50 from a lateral acceleration sensor 32, a throttle opening sensor 33, an engine speed sensor (or an engine control unit for implementing various types of controls related to the engine 1) 34, and a transmission control unit 35 for executing a shift control of the automatic transmission, respectively. Furthermore, a brake switch 36 adapted to be switched on when a brake pedal, not shown, is depressed is provided on the vehicle, and an ON-OFF signal from this brake switch 36 is also inputted into the center differential limiting control unit 50. In addition, a known anti-lock brake system (ABS) for preventing the lock of the wheels when the brakes are applied is also installed in the vehicle, a signal from an ABS control unit 37 which indicates the operating conditions of the ABS (a signal that is switched on when the ABS operates) is also inputted into the center differential limiting control unit 50. Additionally, a variable dial 38 with which the driver can adjust the traction performance to his or her preference; to a characteristic where turning performance is prioritized or to a characteristic where stability is prioritized, by changing the characteristics of the center differential limiting control is provided at a position which allows the driver to operate the same dial.

The center differential limiting control unit 50 has a micro computer and its peripheral circuit and includes mainly, as shown in FIG. 2, a vehicle speed computing unit 50a, a center differential input torque estimating unit 50b, a brake switch delay processing unit 50c, an actual front and rear axle differential speed computing unit 50d, an actual front left and right wheel differential speed computing unit 50e, an actual rear wheel differential speed between the left and right wheels computing unit 50f, a control initiating differential speed computing unit 50g, a target differential speed setting unit 50h, a sliding mode control clutch torque computing unit 50i, a deviatoric proportion control clutch torque computing unit 50j, and a clutch torque computing and outputting unit 50k.

Wheel speeds ωfl, ωfr, ωrl, ωrr of the respective wheels 14FL, 14FR, 14RL, 14RR are inputted into the vehicle speed computing unit 50a from the wheel speed sensors or the respective wheel speed sensors 31FL, 31FR, 31RL, 31RR, and the vehicle speed computing unit 50a computes a vehicle speed V (=(ωfl, ωfr, ωrl, ωrr)/4) by, for example, computing an average of the wheel speeds so inputted and output the vehicle speed so computed to the control initiating differential speed setting unit 50g.

an opening θth of the throttle, an engine speed Ne and a gear ratio Gr are inputted into the center differential limiting control unit 50 from the throttle opening sensor 33, the engine speed sensor (or the engine control unit) 34 and the transmission control unit 35, respectively. Then, an engine output torque Tcd' is obtained, for example, from the throttle opening θth and the engine speed Ne by reference to an engine output characteristics map (an example thereof is shown in FIG. 3) which is stored in advance, and an input torque Tcd that is inputted into the center differential 3 is estimated by multiplying the engine output torque Tcd' so obtained by the gear ratio Gr. Namely, Tcd=Tcd'·Gr. The center differential input torque Tcd so estimated is then outputted to the control initiating differential speed computing unit 50g.

An ON-OFF signal is inputted into the brake switch delay processing unit 50c from the brake switch 36, and in order to prevent hunting, a predetermined short delay time is set when the brake switch 36 is switched from an ON state to an OFF state, whereby the brake switch 36 is put in the OFF state only after the delay time has elapsed when the brake switch 36 is switched from the ON state to the OFF state (note that no delay processing is implemented when the brake switch 36 is switched from the OFF state to the ON state). A brake switch signal that is delay processed at the brake switch delay processing unit 50c is then outputted to the sliding mode control clutch torque computing unit 50i, the deviatoric proportion control clutch torque computing unit 50j, and the clutch torque computing and outputting unit 50k.

The wheel speeds ωfl, ωfr, ωrl, ωrr of the respective wheels 14FL, 14FR, 14RL, 14RR are inputted into the actual front and rear axle differential speed computing unit 50d from the respective wheel speed sensors 31FL, 31FR, 31RL, 31RR, respectively. Then, two types of actual front and rear axle differential speeds Δωctrf, Δωctrr are computed from the wheel speeds so inputted using the following equations (1), (2).

$$\Delta\omega ctrf=((\omega fl+\omega fr)-(\omega rl+\omega rr))/2 \quad (1)$$

$$\Delta\omega ctrr=((\omega rl+\omega rr)-(\omega fl+\omega fr))/2 \quad (2)$$

As this occurs, in the event that the speed of the front axle is faster than the speed of the rear axle, Δωctrf becomes a positive value, and Δωctrr becomes a negative value, whereas in the event that the speed of the front axle is slower than the speed of the rear axle, in contrast, Δωctrf becomes a negative value, and Δωctrr becomes a positive value. The actual front and rear axle differential speeds Δωctrf, Δωctrr so computed are then outputted to the sliding mode control clutch torque computing unit 50i and the deviatoric proportion control clutch torque computing portion 50j. Note that the reason why the two types of actual front and rear axle differential speeds Δωctrf, Δωctrr are computed is because in computation of a clutch torque, which will be described later on, clutch torque setting can be changed such that a torque is transmitted to the axle of a faster speed from the axle of a slower speed depending on whether the actual front and rear axle differential speeds Δωctrf, Δωctrr become positive or negative. Thus, the actual front and rear axle differential speeds Δωctrf, Δωctrr computed at the actual front and rear axle differential speed computing unit 50d are then outputted to the sliding mode control clutch torque computing unit 50i and the deviatoric proportion control clutch torque computing unit 50j.

Wheel speeds ωfl, ωfr of the left and right front wheels 14FL, 14FR and a lateral acceleration Gy are inputted into the actual front left and right wheel differential speed computing unit 50e from the wheel speed sensors 31FL, 31FR of the left and right front wheels and the lateral acceleration sensor 32, and the actual front left and right wheel differential speed computing unit 50e then computes an actual differential speed ΔωFt according to the turning condition (including a condition in which the vehicle runs straight) of the vehicle by using any of the following equations (3), (4), and (5). As this occurs, a turning condition of the vehicle is determined by the lateral acceleration Gy: in the event that an absolute value |Gy| is equal to or smaller than a predetermined value Ays which has been set in advance, the vehicle is determined as running substantially straight, in the event that the lateral acceleration Gy is larger than Ays, the vehicle is determined as turning left, and in the event that the lateral acceleration Gy is smaller than −Ays, the vehicle is determined as turning right. Note that the turning conditions of the vehicle can be determined by any other unit such as yaw rate and steering angle, and therefore, they may be so determined.

When turning right . . . $\Delta\omega Ft=\omega fr-\omega fl$ (3)

When turning left . . . $\Delta\omega Ft=\omega fl-\omega fr$ (4)

When running substantially straight . . . $\Delta\omega Ft=|\omega fr-\omega fl|$ (5)

Note that actual differential speeds ΔωFt obtained by equations (3) and (4) become negative values, since the wheel speed of the turning outside wheel becomes faster than the wheel speed of the turning inside wheel in a condition in which both the left and right front wheels do not slip. Thus, an actual differential speeds ΔωFt between the left and right front wheels 14FL and 14FR so computed is then outputted to the sliding mode control clutch torque computing unit 50i and the deviatoric proportion control clutch torque computing unit 50j.

Wheel speeds ωrl, ωrr of the left and right rear wheels 14RL, 14RR and a lateral acceleration Gy are inputted into the actual rear wheel differential speed between the left and right wheels computing unit 50f from the wheel speed sensors 31RL, 31RR of the left and right rear wheels and the lateral acceleration sensor 32, and the actual rear wheel differential speed between the left and right wheels computing unit 50f then computes an actual differential speed ΔωRr according to a turning condition (including a condition in which the vehicle runs straight) of the vehicle using any of the following equations (6), (7), and (8). As this occurs, a turning condition of the vehicle is determined by the lateral acceleration Gy as with the actual front left and right wheel differential speed computing unit 50e: in the event that an absolute value |Gy| of a lateral acceleration is equal to or smaller than the predetermined value Ays which has been set in advance, the vehicle is determined as running substantially straight, in the event that the lateral acceleration Gy is larger than Ays, the vehicle is determined as turning left, and in the event that the lateral acceleration Gy is smaller than −Ays, the vehicle is determined as turning right. Note that the turning conditions of the vehicle can be determined by any other unit such as yaw rate and steering angle, and therefore, they may be so determined.

When turning right . . . $\Delta\omega Rr=\omega rr-\omega rl$ (6)

When turning left . . . $\Delta\omega Rr=\omega rl-\omega rr$ (7)

When running substantially straight . . . $\Delta\omega Rr=|\omega rr-\omega rl|$ (8)

Note that actual differential speeds ΔωRr obtained by equations (6) and (7) become negative values, since the wheel speed of the turning outside wheel becomes faster than the wheel speed of the turning inside wheel in a condition in which both the left and right rear wheels do not slip. Thus, an actual differential speeds ΔωRr between the left and right rear wheels 14RL and 14RR so computed is then outputted to the sliding mode control clutch torque computing unit 50i and the deviatoric proportion control clutch torque computing unit 50j.

The actual front and rear axle differential speed computing unit 50d, the actual front left and right wheel differential speed computing unit 50e and the actual rear wheel differential speed between the left and right wheels computing unit 50f are provided as actual differential speed detecting unit.

A lateral acceleration Gy, a dial position selected by the driver, a vehicle speed V and an estimated center differential input torque Tcd are inputted into the control initiating differential speed computing unit 50g from the lateral acceleration sensor 32, the variable dial 38, the vehicle speed computing unit 50a and the center differential input torque estimating unit 50b, respectively.

The control initiating differential speed computing unit 50g then computes control initiating differential speeds (front and rear axle control initiating differential speed Δωctrfs, Δωctrrs, front wheel control initiating differential speed ΔωFts, rear wheel control initiating differential speed ΔωRrs) which constitute lower limit values, respectively, of the actual differential speeds Δωctrfs, Δωctrrs between the front and rear axles, the actual differential speed ΔωFt between the left and right front wheels 14FL and 14FR, and the actual differential speed ΔωRrs between the left and right rear wheels 14RL and 14RR according to vehicle speed V, lateral acceleration Gy, center differential input torque Tcd and dial position while referring to a map which has been set in advance.

This setting of control initiating differential speeds will specifically be described by referring to the front and rear axle control initiating differential speed Δωctrfs. Firstly, a basic value Δωctrfsb of the front and rear axle control initiating differential speed Δωctrfs is set based on a current vehicle speed from a basic value map, as shown in FIG. 4, of vehicle speed V and front and rear axle control initiating differential speed Δωtrfs. In addition, a correction coefficient kωgy of the front and rear axle control initiating differential speed Δωctrfs is obtained based on a current lateral acceleration Gy from a map, as shown in FIG. 5, of correction coefficient of the front and rear axle control initiating differential speed Δωctrfs based on the lateral acceleration Gy. Furthermore, a correction coefficient kωt of the front and rear axle control initiating differential speed Δωctrfs is obtained based on a current center differential input torque Tcd from a correction coefficient map, as shown in FIG. 6, of the front and rear axle control initiating differential speed Δωctrfs based on the center differential input torque Tcd. Moreover, a correction coefficient kωdp of the front and rear axle control initiating differential speed Δωctrfs is obtained based on a current dial position from a correction coefficient map, as shown in FIG. 7, of the front and rear axle control initiating differential speed Δωctrfs based on the dial position. Then, the basic value so set is multiplied by the correction coefficients so obtained to compute a final front and rear axle control initiating differential speed Δωctrfs (=Δωctrfsb·kωgy·kωt·kωdp).

Here, the respective control initiating differential speeds Δωctrfs, Δωctrrs, ΔωFts, ΔωRrs are, as will be described later on, threshold values which determine an extent to which the differential limiting control is allowed to be implemented between the front and rear axles, the left and right front wheels and the left and right rear wheels, and in the event that the actual differential speeds Δωctrf, Δωctrr, ΔωFt, ΔωRr are smaller than the control initiating differential speeds Δωctrfs, Δωctrrs, ΔωFts, ΔωRrs, the engagement torque relative to the transfer clutch 21 is made to be 0. In particular, between the front and rear axles, the differential speed that is actually to be controlled becomes too small, and therefore, the transfer clutch 21 is coupled in a stationary friction condition, and the control of the transfer clutch 21 is put in a slip-lock condition, whereby the convergence of the control becomes slow and the control stability is deteriorated. Thus, the control initiating differential speed is set in order to prevent the occurrence of the delayed convergence of the control, as well as the deteriorated control stability. In addition, between the left and right front wheels and left and right rear wheels, in the event that the control initiating differential speeds ΔωFts, ΔωRrs are set at, for example, 0, respectively, when the wheel speed of the turning inside wheel exceeds the wheel speed of the turning outside wheel, the differential limiting control of the center differential is implemented without any delay, whereas in any other cases, the front differential clutch 27 and the rear differential clutch 23 are understood as being in normal operation, the differential limiting control of the center differential is controlled and set so as not to interfere with the control of those differentials.

Then, as specifically shown in FIG. 4, the front and rear axle control initiating differential speed Δωctrfs is set to increase as the vehicle speed V increases, whereby the threshold is relaxed as the speed increases, and the degree of engagement is relaxed as the speed increases, the fuel economy being thereby attempted to be improved.

In addition, as specifically shown in FIG. 5, the front and rear axle control initiating differential speed Δωctrfs is set to increase as the lateral acceleration Gy increases, whereby the threshold value is relaxed as the lateral acceleration Gy increases and the degree of engagement is relaxed as the lateral acceleration Gy increases, the turning performance of the vehicle being thereby improved.

Furthermore, as specifically shown in FIG. 6, the front and rear axle control initiating differential speed Δωctrfs is set to decrease as the center differential input torque Tcd increases, whereby the threshold is made to become severer as the center differential input torque Tcd increases, and the engagement is made to be stronger as the center differential input torque Tcd increases, thereby making it possible to obtain a stable traction performance.

In addition, as specifically shown in FIG. 7, the front and rear axle control initiating differential speed Δωctrfs is allowed to be changed according to a dial position, so that each driver can select a driving facilitating traction performance to his or her preference. In addition, even if the vehicle characteristics change with time or there occurs an error in the characteristics of the vehicle, an appropriate characteristic can be set by the variable dial 38.

In the above front and rear axle control initiating differential speed Δωctrfs, while the front and rear axle control initiating differential speed Δωctrfs can be variably set accurately through all the parameters of vehicle speed V, lateral acceleration Gy, center differential input torque Tcd and dial position, the front and rear axle control initiating differential speed Δωctrfs may be set according to at least any one or more of the parameters. In addition, depending on the specification of the vehicle, the front and rear axle control initiating differential speed Δωctrfs may be a constant value without depending on any of the parameters. Thus, the other control initiating differential speeds Δωctrrs, ΔωFts, ΔωRrs are computed and set, and the respective control initiating differential speeds Δωctrfs, Δωctrrs, ΔωFts, ΔωRrs are then outputted to the target differential speed setting unit 50h, the sliding mode control clutch torque computing unit 50i, and the deviatoric proportion control clutch torque computing unit 50j.

When the respective control initiating differential speeds Δωctrfs, Δωctrrs, ΔωFts, ΔωRrs are inputted thereinto from the control initiating differential speed computing unit 50g, the target differential speed setting unit 50h computes a front and rear axle target differential speeds Δωctrft, Δωtrrt, a front wheel side target differential speed ΔωFtt and a rear-wheel side target differential speed ΔωRrt based on the respective control initiating differential speeds Δωctrfs, Δωctrrs, ΔωFts, ΔωRrs using the following equations (9), (10), (11) and (12).

$$\Delta\omega ctrft = \Delta\omega ctrfs + Cctrft \quad (9)$$

$$\Delta\omega trrt = \Delta\omega ctrrs + Cctrrt \quad (10)$$

$$\Delta\omega Ftt = \Delta\omega Fts + CFtt \quad (11)$$

$$\Delta\omega Rrt = \Delta\omega Rrs + CRrt \quad (12)$$

where, Cctrft, Cctrrt, CFtt and CRr are constants which have been set in advance based on calculations and experiments.

The respective target differential speeds Δωctrft, Δωtrrt, ΔωFtt, ΔωRtt which are set as has been described above are then outputted to the sliding mode control clutch torque computing unit 50*i* and the deviatoric proportion control clutch torque computing unit 50*j*. Thus, the control initiating differential speed computing unit 50*g* and the target differential speed setting unit 50*h* are provided as target differential speed setting unit.

Inputted into the sliding mode control clutch torque computing unit 50*i* are a delay-processed brake switch signal from the brake switch delay processing unit 50*c*, actual front and rear axle differential speeds Δωctrf, Δωtrr from the actual front and rear axle differential speed computing unit 50*d*, an actual differential speed ΔωFt between the left front wheel 14FL and the right front wheel 14 FR from the actual front left and right wheel differential speed computing unit 50*e*, an actual differential speed ΔωRr between the left and right rear wheels 14RL and 14RR from the actual rear wheel differential speed between the left and right wheels computing unit 50*f*, respective control initiating differential speeds Δωctrfs, Δωtrrs, ΔωFts, ΔωRrs from the target differential speed computing unit 50*g*, and respective target differential speeds Δωctrft, Δωtrrt, ΔωFtt, ΔωRtt from the target differential speed setting unit 50*h*. Then, this sliding mode control clutch torque computing unit 50*i* computes a clutch torque of the transfer clutch 21 by obtaining a deviation between the target differential speed and the actual differential speed for each speed, configuring a switching function using at least a polarity related to an integral term of the deviation so obtained and applying the sliding mode control.

Namely, a deviation between the target differential speed and the actual differential speed for each speed can be computed as below.

Differential speed deviation between the front and rear axle $\epsilon ctrf = \Delta\omega ctrf - \Delta\omega ctrft$ (13)

Differential speed deviation between the front and rear axle $\epsilon ctrr = \Delta\omega ctrr - \Delta\omega ctrrt$ (14)

Differential speed deviation between the left front wheel and the right front wheel $\epsilon Ft = \Delta\omega Ft - \Delta\omega Ftt$ (15)

Differential speed deviation between the left rear wheel and the right rear wheel $\epsilon Rr = \Delta\omega Rr - \Delta\omega Rrt$ (16)

Then, clutch torques T SMCctrf, T SMCctrr, T SMCFt, T SMCRr applied to the transfer clutch 21 through sliding mode control for each speed are computed using the following switching function equations (17), (20), (23) and (26).

Firstly, setting a clutch torque T SMCctrf through the sliding mode control utilizing the front and rear axle differential speed deviation εctrf will be described.

$T\ SMCctrf = sat(x\ ctrf)$ (17)

however, when x ctrf>0, T SMCctrf=sat (x ctrf)=x ctrf
when x ctrf≦0, T SMCctrf=sat (x ctrf)=0

$x\ ctrf = k\ wctrf \cdot Jw \cdot (d\ \epsilon ctrf/dt) + Tsg \cdot (sctrf/(|sctrf|+\delta))$ (18)

where, $s\ ctrf = \epsilon ctrf + ki \cdot \int (\epsilon ctrf) dt$ (19)

(however, the integral range is from 0 to t)

In addition, k wctrf is a differential term gain, and when (d εctrf/dt)>0, it is made to be k wu, and when (d εctrf/dt)≦, the differential term gain is made to be k wd. Furthermore, Jw is an inertia term, Tsg a switching gain, δ a chattering prevention constant, and ki an integral term gain.

Then, in case the actual differential speed Δωctrf falls below the control initiating differential speed Δωctrfs, the differential speed that is actually to be controlled becomes too small, and therefore the transfer clutch 21 is coupled in a stationary friction condition and the control of the transfer clutch 21 is put in a slip-lock condition, whereby the convergence of the control becomes slow and the control stability is deteriorated. Thus, in order to prevent the occurrence of the delayed control convergence and the deteriorated control stability, the clutch torque T SMCctrf is made to be 0, and furthermore, the integral value is also reset ($\int(\epsilon ctrf)dt=0$: however, the integral range is from 0 to t). In addition, even when an ON signal of the brake switch is inputted, in order to avoid the interference with a brake condition so produced, the clutch torque T SMCctrf is similarly made to be 0 and the integral value is also reset.

Next, setting a clutch torque T SMCctrr through the sliding mode control utilizing the front and rear axle differential speed deviation εctrr will be described.

$T\ SMCctrr = sat(x\ ctrr)$ (20)

however, when x ctrr>0, T SMCctrr=sat (x ctrr)=x ctrr
when x ctrr≦0, T SMCctrr=sat (x ctrr)=0

$x\ ctrr = k\ wctrr \cdot Jw \cdot (d\ \epsilon ctrr/dt) + Tsg \cdot (sctrr/(|sctrr|+\delta))$ (21)

where, $s\ ctrr = \epsilon ctrr + ki \cdot \int (\epsilon ctrr) dt$ (22)

(however, the integral range is from 0 to t)

In addition, k wctrr is a differential term gain, and when (d εctrr/dt)>0, it is made to be k wu, and when (d εctrr/dt)≦0, the differential term gain is made to be k wd. Furthermore, Jw is an inertia term, Tsg a switching gain, δ a chattering prevention constant, and ki an integral term gain.

Then, in case the actual differential speed Δωctrr falls below the control initiating differential speed Δωctrrs, the differential speed that is actually to be controlled becomes too small, and therefore the transfer clutch 21 is coupled in a stationary friction condition and the control of the transfer clutch 21 is put in a slip-lock condition, whereby the convergence of the control becomes slow and the control stability is deteriorated. Thus, in order to prevent the occurrence of the delayed control convergence and the deteriorated control stability, the clutch torque T SMCctrr is made to be 0, and furthermore, the integral value is also reset ($\int(\epsilon ctrr)dt=0$: however, the integral range is from 0 to t). In addition, even when an ON signal of the brake switch is inputted, in order to avoid the interference with a brake condition so produced, the clutch torque T SMCctrr is similarly made to be 0 and the integral value is also reset.

Next, setting a clutch torque T SMCFt through the sliding mode control utilizing the front left and right inter-wheel differential speed deviation εFt.

$T\ SMCFt = sat(x\ Ft)$ (23)

however, when x Ft>0, T SMCFt=sat (x Ft)=x Ft
when x Ft≦0, T SMCFt=sat (x Ft)=0

$x\ Ft = k\ wFt \cdot Jw \cdot (d\ \epsilon Ft/dt) + Tsg \cdot (s\ Ft/(|s\ Ft|+\delta))$ (24)

where, $$sFt = \epsilon Ft + ki \cdot \int (\epsilon Ft)dt \qquad (25)$$

(however, the integral range is from 0 to t)

In addition, k wFt is a differential term gain, and when (d εFt/dt)>0, it is made to be k wu, and when (d εFt/dt)≦0, the differential term gain is made to be k wd. Furthermore, Jw is an inertia term, Tsg a switching gain, δ a chattering prevention constant, and ki an integral term gain.

Then, in case the actual front left and right wheel differential speed ΔωFt becomes lower than the control initiating differential speed ΔωFts, it is determined that the resulting condition can sufficiently be dealt with through the control of the front differential clutch 27, and the clutch torque T SMCFt is made to be so that the control of the transfer clutch 21 does not come into interference with the control of the front differential clutch 27 more than required, and furthermore, the integral value is also reset (∫(εFt)dt=0: however, the integral range is from 0 to t). In addition, even when an ON signal is inputted from the brake switch, in order to avoid the interference with a brake condition so produced, similarly, the clutch torque T SMCFt is made to be 0, and the integral value is reset.

Next, setting a clutch torque T SMCRr through the sliding mode control utilizing the rear left and right inter-wheel differential speed deviation εRr.

$$T\,SMCRr = sat(x\,Rf) \qquad (26)$$

however, when x Rr>0, T SMCRr=sat (x Rr)=x Rr
when x Rr≦0, T SMCRr=sat (x Rr)=0

$$x\,Rr = k\,wRr \cdot Jw \cdot (d\,\epsilon Rr/dt) + Tsg \cdot (Rr/(|s\,Rr|+\delta)) \qquad (27)$$

where, $$sRr = \epsilon Rr + ki \cdot \int (\epsilon Rr)dt \qquad (28)$$

(however, the integral range is from 0 to t)

In addition, k wRr is a differential term gain, and when (d εRr/dt)>0, it is made to be k wu, and when (d εRr/dt)≦0, the differential term gain is made to be k wd. Furthermore, Jw is an inertia term, Tsg a switching gain, δ a chattering prevention constant, and ki an integral term gain.

Then, in case the actual rear wheel differential speed between the left and right wheels ΔωRr becomes lower than the control initiating differential speed ΔωRrs, it is determined that the resulting condition can sufficiently be dealt with through the control of the rear differential clutch 23, and the clutch torque T SMCRr is made to be so that the control of the transfer clutch 21 does not come into interference with the control of the rear differential clutch 23 more than required, and furthermore, the integral value is also reset (∫(εRr)dt=0: however, the integral range is from 0 to t). In addition, even when an ON signal is inputted from the brake switch, in order to avoid the interference with a brake condition so produced, similarly, the clutch torque T SMCRr is made to be 0, and the integral value is reset.

Thus, in the sliding control mode according to the embodiment, the switching function is configured using the polarity concerning the integral term of the deviation. Namely, in the switching function equation (18), the polarity concerning the integral term is obtained by dividing the integral term s ctrf by (|s ctrf|+δ), in the switching function equation (21), the polarity concerning the integral term is obtained by dividing the integral term s ctrr of the deviation by (|s ctrr|+δ), in the switching function equation (24), the polarity concerning the integral term is obtained by dividing the integral term sFt of the deviation by (|sFt|+δ), and in the switching function equation (27), the polarity concerning the integral term is obtained by dividing the integral term sRr of the deviation by (|sRr|+δ). Note that δ is also made to be a value which prevents a division by 0. Due to this, even if values of the respective integral terms are small, irrespective of the smallness of the values, the values are used in implementing a sliding mode control so as to set a clutch torque, whereby it is possible to deal with a high response, thereby making it possible to realize a traction performance with high accuracy and good response.

In addition, the sliding mode control according to the embodiment can be described differently from the above description thereof. To describe a case where a differential speed deviation εctrf between the front and rear axles, a switching function sat (xctrf) is configured which has a term resulting from multiplying a value sctrf/(|sctrf|+δ) of polarity calculated using the integral term sctrf of a deviation by a predetermined gain Tsg, and when this switching function takes a positive value or sat (xctrf) is larger than 0, the clutch torque is set using the value of sat (xctrf) as a control value.

In other words, when attempting to compute a clutch torque through the conventional PID control, since the integral term possesses the past hysteresis of control deviation, the response becomes deteriorated. However, in the present invention, since only the gain is changed in an ON-OFF fashion using the polarity of the integral term so as to compute a clutch torque using the sliding mode control in which the actual value is caused to approximate the target value, the response can be improved without reflecting the past history as done in the conventional integral control, and an inexpensive system can be attained. In addition, since the polarity of the integral term is used, chattering itself can be prevented.

Thus, the respective clutch torques T SMCctrf, T SMCctrr, T SMCFt, T SMCRr which are computed at the sliding mode control clutch torque computing unit 50*i* are then outputted to the clutch torque computing unit 50*k*.

Inputted into the deviatoric proportion control clutch torque computing unit 50*j* are a delay-processed brake switch signal from the brake switch delay processing unit 50*c*, actual front and rear axle differential speeds Δωctrf, Δωtrr from the actual front and rear axle differential speed computing unit 50*d*, an actual differential speed ΔωFt between the left front wheel 14FL and the right front wheel 14 FR from the actual front left and right wheel differential speed computing unit 50*e*, an actual differential speed ΔωRr between the left and right rear wheels 14RL and 14RR from the actual rear wheel differential speed between the left and right wheels computing unit 50*f*, respective control initiating differential speeds Δωctrfs, Δωtrrs, ΔωFts, ΔωRrs from the control initiating differential speed computing unit 50*g*, and respective target differential speeds Δωctrft, Δωtrrt, ΔωFtt, ΔωRrt from the target differential speed setting unit 50*h*. Then, this deviatoric proportion control torque computing unit 50*j* obtains a deviation between the target differential speed and the actual differential speed for each speed, as will be described later on and computes proportional components of the clutch torque (clutch torques T pcctrf, T pctrr, T pcFt, TpcRf) which allow the actual differential speed to converge on the target differential speed according to the deviation so obtained.

Namely, a deviation between the target differential speed and the actual differential speed for each speed can be computed as below.

Differential speed deviation between the front and
rear axle $\epsilon pctrf=\Delta\omega ctrf-\Delta\omega ctrfi-(\Delta\omega ctrfi-\Delta\omega ctrfs)$ (29)

Differential speed deviation between the front and
rear axle $\epsilon pctrr=\Delta\omega ctrr-\Delta\omega ctrrt-(\Delta\omega ctrrt-\Delta\omega ctrrs)$ (30)

Differential speed deviation between the left front
wheel and the right front wheel $\epsilon pFt=\Delta\omega Ft-\Delta\omega Ftt-(\Delta\omega Ftt-\Delta\omega Fts)$ (31)

Differential speed deviation between the left rear
wheel and the right rear wheel $\epsilon pRr=\Delta\omega Rr-\Delta\omega Rrt-(\Delta\omega Rrt-\Delta\omega Rrs)$ (32)

Then, clutch torques T pcctrf, T pcctrr, T pcft, T pcRr provided through the deviatoric proportion control are calculated as follows.

Firstly, a clutch torque T pcctrf provided through the deviatoric proportion control utilizing the front and rear axle differential speed deviation $\epsilon pctrf$ is calculated as below:

in the event of $\epsilon pctrf>0$, T pcctrf=kp1·$\epsilon pctrf$+kp2·$\Delta\omega ctrf$,
in the event of $\epsilon pctrf\leqq 0$, T pcctrf=kp2·$\Delta\omega ctrf$.

Next, a clutch torque T pcctrr provided through the deviatoric proportion control utilizing the front and rear axle differential speed deviation $\epsilon pctrr$ is calculated as below:

in the event of $\epsilon pctrr>0$, T pcctrr=kp1·$\epsilon pctrr$+kp2·$\Delta\omega$)ctrr,
in the event of $\epsilon pctrr\leqq 0$, T pcctrr=kp2·$\Delta\omega ctrr$.

Next, a clutch torque T pcFt provided through the deviatoric proportion control utilizing the front left and right inter-wheel differential speed deviation $\epsilon pFt$ is calculated as below:

in the event of $\epsilon pFt>0$, T pcFt=kp1·$\epsilon pFt$+kp2·$\Delta\omega Ft$,
in the event of $\epsilon pFt\leqq 0$, T pcFt=$\Delta\omega Ft$.

Next, a clutch torque T pcRr provided through the deviatoric proportion control utilizing the rear left and right inter-wheel differential speed deviation $\epsilon pRr$ is calculated as below:

in the event of $\epsilon pRr>0$, T pcRr=kp1·$\epsilon pRr$+kp2·$\Delta\omega Rr$,
in the event of $\epsilon pRr\leqq 0$, T pcRr=$\Delta\omega Rr$, where kp1 is a first proportion term gain, and kp2 is a second proportion term gain.

In addition, the respective clutch torques T pcctrf, T pcctrr, T pcFt and T pcRr provided by the deviatoric proportion control are set at 0 when an ON signal is inputted from the brake switch so as to avoid an interference with a brake condition produced by the singal.

Thus, the respective clutch torques T pcctrf, T pcctrr, T pcFt and T pcRr which are computed at the deviatoric proportion control clutch torque computing unit 50j are then outputted to the clutch torque computing unit 50k.

Inputted into the clutch torque computing unit 50k are a signal indicating an operating condition of the ABS from the ABS control unit 37, a delay processed brake switch signal from the brake switch delay processing unit 50c, respective clutch torques T SMCctrf, T SMCctrr, T SMCFt and T SMCRr from the sliding mode control clutch torque computing unit 50i, and respective clutch torques T pcctrf, T pcctrr, T pcFt and T pcRr from the deviatoric proportion control clutch torque computing unit 50j.

Then, as will be described below, four corresponding clutch torques T ctrf, T ctrr, T Ft and T Rf are obtained through addition of the corresponding clutch torques from the sliding mode control clutch torque computing unit 50i and the deviatoric proportion control clutch torque computing unit 50j, and of the torques so obtained the torque of a maximum value is set as a final clutch torque Tcd of the transfer clutch 21, a control signal being outputted to the center differential clutch driving unit 51 so that the clutch torque Tcd is so provided.

Namely,
T ctrf=T SMCctrf+T pcctrf
T ctrr=T SMCctrr+T pcft
T Ft=T SMCFt+T pcFt
T Rr=T SMCRr+T pcRr $$T\ lsdfb=\text{MAX}\ (T\ ctrf,\ T\ ctrr,\ T\ Ft,\ T\ Rr) \quad (33)$$

Here, in the event that there is sent from the ABS control unit 37 an ON signal or a signal indicating that ABS is in operation, the clutch torque Tcd is made to be a constant value CABS that has been set in advance in order to prevent the interference with ABS control. In addition, also in the event that there is sent from the brake switch delay processing unit 50c an ON signal indicating that the brake switch is switched on, the clutch torque Tcd is also made to be a constant value Cbrk that has been set in advance in order to prevent the interference with a brakes-applied condition so produced.

Thus, in the embodiment of the present invention, clutch torque computing unit are mainly constituted by the sliding mode control clutch torque computing unit 50i, the deviatoric proportion control clutch torque computing unit 50j and the clutch torque computing and outputting unit 50k.

Note that according to the embodiment of the present invention, while the four clutch torques T ctrf, T ctrr, T Ft and T Rr are computed and of the clutch torques so computed the clutch torque having a maximum value is controlled to become the final engagement torque of the transfer clutch 21, depending on the specifications of the vehicle, all of the four clutch torques do not have to be obtained but any one or some of the four clutch torques may be obtained so that a clutch torque or clutch torques so obtained are controlled to become the final engagement torque of the transfer clutch 21.

In addition, while the embodiment of the present invention has been described by reference to the control of the transfer clutch 21 for controlling the limitation of differential motion of the center differential 3, the present invention can be similarly applied to a clutch for controlling the limitation of differential motion between the front and rear axles of a four wheel drive vehicle which is not provided with the center differential 3. Furthermore, in the event that the front differential clutch 27 and the rear differential clutch 23 have a device for controlling the clutch torque thereof, it goes without saying that the setting of the clutch torques through the sliding mode control described in the embodiment can be applied to setting of such clutch torques.

Additionally, according to the embodiment of the present invention, while the four final clutch torques Tctrf, Tctrr, TFt, TRr are described as being obtained by adding the respective clutch torques TSMCctrf, TSMCctrr, TSMCFt, TSMCRr from the sliding mode control clutch torque computing unit 50i to the respective clutch torques Tpctrf, Tpcctrr, TpcFt, TpcRr from the deviatoric proportion control clutch torque computing unit 50j, respectively, in a vehicle which is little affected by the respective clutch torques Tpctrf, Tpcctrr, TpcFt, TpcRr from the deviatoric proportion control clutch torque computing unit 50j, only the respective clutch torques TSMCctrf, TSMCctrr, TSMCFt, TSMCRr from the sliding mode control clutch torque computing unit 50i maybe made to become the four final clutch torques Tctrf, Tctrr, TFt, TRr.

Thus, as has been described heretofore, according to the present invention, a highly accurate and good-response traction performance can be realized without increasing the costs of the whole system and making the system complicated.

The disclosure of Japanese Patent Application No. 2002-278130 filed on Sep. 24, 2002 including the specification, drawings and abstract is incorporated herein by reference in its entirety.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. A differential limiting control apparatus for a vehicle comprising:
    a clutch unit interposed between one rotational shaft and the other rotational shaft for variably transmitting a driving force between the one rotational shaft and the other rotational shaft;
    a target differential speed setting unit for setting a target differential speed between the one rotational shaft and the other rotational shaft;
    an actual differential speed detecting unit for detecting an actual differential speed between the one rotational shaft and the other rotational shaft; and
    a clutch torque computing unit for computing an engagement force of the clutch unit by obtaining a deviation between the target differential speed and the actual differential speed, configuring a switching function by using at least a polarity related to an integral term of the deviation, and applying a sliding mode control.

2. The differential limiting control apparatus as set forth in claim 1, wherein the switching function configured at the clutch torque computing unit is such as to result from adding a value obtained by multiplying a differential term of the deviation between the target differential speed and the actual differential speed by a predetermined gain to a value obtained by multiplying a value of the polarity by a predetermined gain.

3. The differential limiting control apparatus as set forth in claim 1, wherein the clutch torque computing unit computes a final engagement force of the clutch unit by adding a value obtained by multiplying a proportional term of the deviation between the target differential speed and the actual differential speed by a predetermined gain to an engagement force of the clutch unit computed through the sliding mode control.

4. The differential limiting control apparatus as set forth in claim 2, wherein the clutch torque computing unit computes a final engagement force of the clutch unit by adding a value obtained by multiplying a proportional term of the deviation between the target differential speed and the actual differential speed by a predetermined gain to an engagement force of the clutch unit computed through the sliding mode control.

5. The differential limiting control apparatus as set forth in claim 1,
    wherein the clutch unit is interposed between a front and a rear axles, wherein the target differential speed setting unit sets a target differential speed at least either one of between the front and rear axles, a left front wheel and a right front wheel, or a left rear wheel and a right rear wheel, wherein the actual differential speed detecting unit detects an actual differential speed at least either one of between the front and rear axles, the left front wheel and the right front wheel, or the left rear wheel and the right rear wheel which corresponds to the target differential speed setting unit, and wherein the clutch torque computing unit computes an engagement force of the clutch unit using a deviation between a target differential speed set at the target differential speed setting unit and an actual differential speed detected at the actual differential speed detecting unit.

6. The differential limiting control apparatus as set forth in claim 2,
    wherein the clutch unit is interposed between a front and a rear axles, wherein the target differential speed setting unit sets a target differential speed at least either one of between the front and rear axles, a left front wheel and a right front wheel, or a left rear wheel and a right rear wheel, wherein the actual differential speed detecting unit detects an actual differential speed at least either one of between the front and rear axles, the left front wheel and the right front wheel, or the left rear wheel and the right rear wheel which corresponds to the target differential speed setting unit, and wherein the clutch torque computing unit computes an engagement force of the clutch unit using a deviation between a target differential speed set at the target differential speed setting unit and an actual differential speed detected at the actual differential speed detecting unit.

7. The differential limiting control apparatus as set forth in claim 1,
    wherein the clutch unit is clutch unit for limiting a differential motion of a differential interposed between left and right wheels, the target differential speed setting unit sets a target differential speed between the left and right wheels, the actual differential speed detecting unit detects an actual differential speed between the left and right wheels, and the clutch torque computing unit computes an engagement force of the clutch unit using a deviation between a target differential speed set at the target differential speed setting unit and an actual differential speed detected at the actual differential speed detecting unit.

8. The differential limiting control apparatus as set forth in claim 2,
    wherein the clutch unit is clutch unit for limiting a differential motion of a differential interposed between left and right wheels, the target differential speed setting unit sets a target differential speed between the left and right wheels, the actual differential speed detecting unit detects an actual differential speed between the left and right wheels, and the clutch torque computing unit computes an engagement force of the clutch unit using a deviation between a target differential speed set at the target differential speed setting unit and an actual differential speed detected at the actual differential speed detecting unit.

9. The differential limiting control apparatus as set forth in claim 1,
    wherein the clutch unit is interposed between a front and a rear axles, the target differential speed setting unit sets target differential speeds at least a plurality of between the front and rear axles, a left front wheel and a right front wheel, and a left rear wheel and a right rear wheel, the actual differential speed detecting unit detects actual differential speeds at least a plurality of between the front and rear axles, the left front wheel and the right front wheel, and the left rear wheel and the right rear wheel which correspond to the target differential speed setting unit, and the clutch torque computing unit computes a plurality of engagement forces of the clutch unit using target differential speeds set at the target differential speed setting unit and actual differential speeds detected at the actual differential speed detecting unit and computes one of the plurality of engagement forces of the clutch unit which has a maximum value as a final engagement force of the clutch unit.

10. The differential limiting control apparatus as set forth in claim 2,
wherein the clutch unit is interposed between a front and a rear axles, the target differential speed setting unit sets target differential speeds at least a plurality of between the front and rear axles, a left front wheel and a right front wheel, and a left rear wheel and a right rear wheel, the actual differential speed detecting unit detects actual differential speeds at least a plurality of between the front and rear axles, the left front wheel and the right front wheel, and the left rear wheel and the right rear wheel which correspond to the target differential speed setting unit, and the clutch torque computing unit computes a plurality of engagement forces of the clutch unit using target differential speeds set at the target differential speed setting unit and actual differential speeds detected at the actual differential speed detecting unit and computes one of the plurality of engagement forces of the clutch unit which has a maximum value as a final engagement force of the clutch unit.

11. The differential limiting control apparatus as set forth in claim 1, wherein the target differential speed setting unit sets in advance a lower limit value of the actual differential speed according to at least one of a vehicle speed, a lateral acceleration and an input torque inputted into the clutch unit and sets the target differential speed based on the lower limit value so set.

12. The differential limiting control apparatus as set forth in claim 2, wherein the target differential speed setting unit sets in advance a lower limit value of the actual differential speed according to at least one of a vehicle speed, a lateral acceleration and an input torque inputted into the clutch unit and sets the target differential speed based on the lower limit value so set.

13. The differential limiting control apparatus as set forth in claim 1, wherein the target differential speed setting unit selectively alter the target differential value that is set thereby.

14. The differential limiting control apparatus as set forth in claim 2, wherein the target differential speed setting unit selectively alter the target differential value that is set thereby.

15. The differential limiting control apparatus as set forth in claim 1, wherein the clutch torque computing unit leaves an engagement force of the clutch unit a preset value at least either one of when brakes are applied or when an antilock braking system is in operation.

16. The differential limiting control apparatus as set forth in claim 2, wherein the clutch torque computing unit leaves an engagement force of the clutch unit a preset value at least either one of when brakes are applied or when an antilock braking system is in operation.

17. A differential limiting control apparatus for a vehicle comprising:
a clutch unit interposed between one rotational shaft and the other rotational shaft for variably transmitting a driving force between the one rotational shaft and the other rotational shaft;
a target differential speed setting unit for setting a target differential speed between the one rotational shaft and the other rotational shaft;
an actual differential speed detecting unit for detecting an actual differential speed between the one rotational shaft and the other rotational shaft; and
a clutch torque computing unit for computing an engagement force of the clutch unit by configuring a switching function having a term where a value of a polarity computed using an integral term based on at least a deviation between the target differential speed and the actual differential speed is multiplied by a predetermined gain and using a sliding mode control where when the switching function takes a positive value, the value of the switching function is used as a control value.

18. The differential limiting control apparatus as set forth in claim 17, wherein the switching function configured at the clutch torque computing unit is such as to result from adding a value obtained by multiplying a differential term of the deviation between the target differential speed and the actual differential speed by a predetermined gain to a value obtained by multiplying a value of the polarity by a predetermined gain.

19. The differential limiting control apparatus as set forth in claim 17, wherein the clutch torque computing unit computes a final engagement force of the clutch unit by adding an engagement force of the clutch unit computed through a proportional control based on the target differential speed and the actual differential speed to an engagement force of the clutch unit computed through the sliding mode control.

20. The differential limiting control apparatus as set forth in claim 18, wherein the clutch torque computing unit computes a final engagement force of the clutch unit by adding an engagement force of the clutch unit computed through a proportional control based on the target differential speed and the actual differential speed to an engagement force of the clutch unit computed through the sliding mode control.

21. The differential limiting control apparatus as set forth in claim 17,
wherein the clutch unit is interposed between a front and a rear axles, wherein the target differential speed setting unit sets a target differential speed at least either one of between the front and rear axles, a left front wheel and a right front wheel, or a left rear wheel and a right rear wheel, wherein the actual differential speed detecting unit detects an actual differential speed at least either one of between the front and rear axles, the left front wheel and the right front wheel, or the left rear wheel and the right rear wheel which corresponds to the target differential speed setting unit, and wherein the clutch torque computing unit computes an engagement force of the clutch unit using a deviation between a target differential speed set at the target differential speed setting unit and an actual differential speed detected at the actual differential speed detecting unit.

22. The differential limiting control apparatus as set forth in claim 18,
wherein the clutch unit is interposed between a front and a rear axles, wherein the target differential speed setting unit sets a target differential speed at least either one of between the front and rear axles, a left front wheel and a right front wheel, or a left rear wheel and a right rear wheel, wherein the actual differential speed detecting unit detects an actual differential speed at least either one of between the front and rear axles, the left front wheel and the right front wheel, or the left rear wheel and the right rear wheel which corresponds to the target differential speed setting unit, and wherein the clutch torque computing unit computes an engagement force of the clutch unit using a deviation between a target differential speed set at the target differential speed setting unit and an actual differential speed detected at the actual differential speed detecting unit.

23. The differential limiting control apparatus as set forth in claim 17,
wherein the clutch unit is clutch unit for limiting a differential motion of a differential interposed between left and right wheels, the target differential speed setting unit sets a target differential speed between the left and right wheels, the actual differential speed detecting unit detects an actual differential speed between the left and right wheels, and the clutch torque computing unit computes an engagement force of the clutch unit using a deviation between a target differential speed set at the target differential speed setting unit and an actual differential speed detected at the actual differential speed detecting unit.

24. The differential limiting control apparatus as set forth in claim 18,
wherein the clutch unit is clutch unit for limiting a differential motion of a differential interposed between left and right wheels, the target differential speed setting unit sets a target differential speed between the left and right wheels, the actual differential speed detecting unit detects an actual differential speed between the left and right wheels, and the clutch torque computing unit computes an engagement force of the clutch unit using a deviation between a target differential speed set at the target differential speed setting unit and an actual differential speed detected at the actual differential speed detecting unit.

25. The differential limiting control apparatus as set forth in claim 17,
wherein the clutch unit is interposed between a front and a rear axles, the target differential speed setting unit sets target differential speeds at least a plurality of between the front and rear axles, a left front wheel and a right front wheel, and a left rear wheel and a right rear wheel, the actual differential speed detecting unit detects actual differential speeds at least a plurality of between the front and rear axles, the left front wheel and the right front wheel, and the left rear wheel and the right rear wheel which correspond to the target differential speed setting unit, and the clutch torque computing unit computes a plurality of engagement forces of the clutch unit using target differential speeds set at the target differential speed setting unit and actual differential speeds detected at the actual differential speed detecting unit and computes one of the plurality of engagement forces of the clutch unit which has a maximum value as a final engagement force of the clutch unit.

26. The differential limiting control apparatus as set forth in claim 18,
wherein the clutch unit is interposed between a front and a rear axles, the target differential speed setting unit sets target differential speeds at least a plurality of between the front and rear axles, a left front wheel and a right front wheel, and a left rear wheel and a right rear wheel, the actual differential speed detecting unit detects actual differential speeds at least a plurality of between the front and rear axles, the left front wheel and the right front wheel, and the left rear wheel and the right rear wheel which correspond to the target differential speed setting unit, and the clutch torque computing unit computes a plurality of engagement forces of the clutch unit using target differential speeds set at the target differential speed setting unit and actual differential speeds detected at the actual differential speed detecting unit and computes one of the plurality of engagement forces of the clutch unit which has a maximum value as a final engagement force of the clutch unit.

27. The differential limiting control apparatus as set forth in claim 17, wherein the target differential speed setting unit sets in advance a lower limit value of the actual differential speed according to at least one of a vehicle speed, a lateral acceleration and an input torque inputted into the clutch unit and sets the target differential speed based on the lower limit value so set.

28. The differential limiting control apparatus as set forth in claim 18, wherein the target differential speed setting unit sets in advance a lower limit value of the actual differential speed according to at least one of a vehicle speed, a lateral acceleration and an input torque inputted into the clutch unit and sets the target differential speed based on the lower limit value so set.

29. The differential limiting control apparatus as set forth in claim 17, wherein the target differential speed setting unit selectively alter the target differential value that is set thereby.

30. The differential limiting control apparatus as set forth in claim 18, wherein the target differential speed setting unit selectively alter the target differential value that is set thereby.

31. The differential limiting control apparatus as set forth in claim 17, wherein the clutch torque computing unit leaves an engagement force of the clutch unit a preset value at least either one of when brakes are applied or when an antilock braking system is in operation.

32. The differential limiting control apparatus as set forth in claim 18, wherein the clutch torque computing unit leaves an engagement force of the clutch unit a preset value at least either one of when brakes are applied or when an antilock braking system is in operation.

33. A differential limiting control method for a vehicle having clutch unit interposed between one rotational shaft and, the other rotational shaft for variably transmitting a driving force between the one rotational shaft and the other rotational shaft, comprising steps of:
setting a target differential speed between the one rotational shaft and the other rotational shaft, detecting an actual differential speed between the one rotational shaft and the other rotational shaft, and
computing an engagement force of the clutch unit by obtaining a deviation between the target differential speed and the actual differential speed, configuring a switching function by using at least a polarity related to an integral term of the deviation, and applying a sliding mode control.

34. The differential limiting control method as set forth in claim 33, wherein the switching function configured at the clutch torque computing step is such as to result from adding a value obtained by multiplying a differential term of the deviation between the target differential speed and the actual differential speed by a predetermined gain to a value obtained by multiplying a value of the polarity by a predetermined gain.

35. The differential limiting control method as set forth in claim 33, wherein the clutch torque computing step computes a final engagement force of the clutch unit by adding a value obtained by multiplying a proportional term of the deviation between the target differential speed and the actual differential speed by a predetermined gain to an engagement force of the clutch unit computed through the sliding mode control.

36. A differential limiting control method for a vehicle having clutch unit interposed between one rotational shaft and the other rotational shaft for variably transmitting a driving force between the one rotational shaft and the other rotational shaft, comprising steps of:

setting a target differential speed between the one rotational shaft and the other rotational shaft, detecting an actual differential speed between the one rotational shaft and the other rotational shaft, and computing an engagement force of the clutch unit by configuring a switching function having a term where a value of a polarity computed using an integral term based on at least a deviation between the target differential speed and the actual differential speed is multiplied by a predetermined gain and using a sliding mode control where when the switching function takes a positive value, the value of the switching function is used as a control value.

37. The differential limiting control method as set forth in claim 36, wherein the switching function configured at the clutch torque computing step is such as to result from adding a value obtained by multiplying a differential term of the deviation between the target differential speed and the actual differential speed by a predetermined gain to a value obtained by multiplying a value of the polarity by a predetermined gain.

38. The differential limiting control method as set forth in claim 36, wherein the clutch torque computing step computes a final engagement force of the clutch unit by adding an engagement force of the clutch unit computed through a proportional control based on the target differential speed and the actual differential speed to an engagement force of the clutch unit computed through the sliding mode control.

39. The differential limiting control method as set forth in claim 33, wherein the clutch unit is interposed between a front and a rear axles, wherein the target differential speed setting step sets a target differential speed at least either one of between the front and rear axles, a left front wheel and a right front wheel, or a left rear wheel and a right rear wheel, wherein the actual differential speed detecting step detects an actual differential speed at least either one of between the front and rear axles, the left front wheel and the right front wheel, or the left rear wheel and the right rear wheel which corresponds to the target differential speed setting step, and wherein the clutch torque computing step computes an engagement force of the clutch unit using a deviation between a target differential speed set at the target differential speed setting step and an actual differential speed detected at the actual differential speed detecting step.

40. The differential limiting control method as set forth in claim 33, wherein the clutch unit is clutch unit for limiting a differential motion of a differential interposed between left and right wheels, the target differential speed setting step sets a target differential speed between the left and right wheels, the actual differential speed detecting step detects an actual differential speed between the left and right wheels, and the clutch torque computing step computes an engagement force of the clutch unit using a deviation between a target differential speed set at the target differential speed setting step and an actual differential speed detected at the actual differential speed detecting step.

41. The differential limiting control method as set forth in claim 33, wherein the clutch unit is interposed between a front and a rear axles, the target differential speed setting step sets target differential speeds at least a plurality of between the front and rear axles, a left front wheel and a right front wheel, and a left rear wheel and a right rear wheel, the actual differential speed detecting step detects actual differential speeds at least a plurality of between the front and rear axles, the left front wheel and the right front wheel, and the left rear wheel and the right rear wheel which correspond to the target differential speed setting step, and the clutch torque computing step computes a plurality of engagement forces of the clutch unit using target differential speeds set at the target differential speed setting step and actual differential speeds detected at the actual differential speed detecting step and computes one of the plurality of engagement forces of the clutch unit which has a maximum value as a final engagement force of the clutch unit.

42. The differential limiting control method as set forth in claim 33, wherein the target differential speed setting step sets in advance a lower limit value of the actual differential speed according to at least one of a vehicle speed, a lateral acceleration and an input torque inputted into the clutch unit and sets the target differential speed based on the lower limit value so set.

43. The differential limiting control method as set forth in claim 33, wherein the target differential speed setting step selectively alter the target differential value that is set thereby.

44. The differential limiting control method as set forth in claim 33, wherein the clutch torque computing step leaves an engagement force of the clutch unit a preset value at least either one of when brakes are applied or when an antilock braking system is in operation.

* * * * *